Patented Jan. 18, 1949

2,459,597

UNITED STATES PATENT OFFICE 2,459,597

DI-ALKYLATED MONO-HYDROXY PHENOL

Gordon H. Stillson, Oakmont, and David W. Sawyer, Pittsburgh, Pa., assignors to Gulf Research & Development Company, Pittsburgh, Pa., a corporation of Delaware No Drawing. Application May 16, 1945,
Serial No. 594,178

2 Claims. (Cl. 260—624)

This invention relates to di-alkylated mono-hydroxy phenols, and more particularly to 2,6-di-tertiary-butylphenol, a compound which is soluble in oil, insoluble in water and in dilute aqueous alkali solutions, and which possesses the property of inhibiting oxidational changes in petroleum hydrocarbon products when added thereto in relatively small amounts.

In U. S. Patents No. 2,248,828, which issued July 8, 1941, there is described a method for the preparation of 2,4,6-tri-tertiary-butylphenol in which phenol is alkylated with isobutylene until no more isobutylene condenses with the phenol. It has been found that 2,6-di-tertiary-butylphenol cannot be prepared in this manner.

Thus, in accordance with the present invention 2,6-di-tertiary-butylphenol is produced by displacing halogen from the product which is formed when a p-halophenol such as p-bromophenol is reacted with isobutylene. The new compound is soluble in oil and insoluble in dilute aqueous alkali solutions. It has further been discovered that this new compound possesses good anti-oxidant properties and that, when added to petroleum products such as gasoline, lubricating oils, turbine oils, and the like in relatively small amounts, it stabilizes these materials against oxidational changes.

In preparing 2,6-di-tertiary-butylphenol, isobutylene, either alone or in admixture with other hydrocarbons, may be used in alkylating the p-halophenol. Cracked gasoline as normally produced, and the heavier of the hydrocarbons usually found as vapors in cracking-still gases contain varying quantities of isobutylene as well as higher olefins, and may be used as starting materials. On the other hand, the isobutylene may be used in isolated form or in admixture with other closely related olefins or paraffins. For example, so-called "debutanizer" gas may be employed as a starting material, as may isobutylene itself. This is a hydrocarbon fraction containing roughly 95 or more per cent of $C_4$ hydrocarbons; it occurs in cracked petroleum products. It will be readily understood that when it is desirable to prepare 2,6-di-tertiary-butylphenol, free or substantially free from other compounds, the raw material should not comprise mixtures of olefins or mixtures of phenol and cresols, except in those cases in which the extraneous compounds will not react, or in which the natures of the individual products will permit easy isolation and separation after alkylation. As to mixtures of isobutylene and paraffins such as butane, the presence of the paraffin has no effect on the operation other than to reduce the concentration of the isobutylene. The butane does not enter into the reaction with the p-halophenol.

In general the reaction involves two steps, the first of which involves alkylating a p-halophenol such as p-bromophenol with isobutylene. Thus, at temperatures up to about 80° C., and under atmospheric or moderately elevated pressures, the usual condensing agents are employed, including sulfuric acid, phosphoric acid, anhydrous aluminum chloride, boron trifluoride, ferric chloride, hydrogen chloride, and the like. These are conventional alkylating catalysts. Sulfuric acid is ordinarily most satisfactory by reason of its efficiency and low cost. The amount of acid condensing agent required is relatively small with respect to the amount of p-halophenol. In most instances, the amount of acid-condensing agent required is as little as about 1% of the p-halophenol or less. In using sulfuric acid as the condensing agent, and when it is desired to utilize the isobutylene efficiently, it is usually better to employ the acid in an amount equal to not less than about 3% of the p-halophenol. More than 10% of the condensing agent, based on the amount of p-halophenol, is not ordinarily worth while. At higher temperatures and pressures, for example, from about 200° to 300° C. or higher, and 1000 lbs./sq. in. or somewhat higher, condensing agents are sometimes unnecessary and may be eliminated. The temperature should not be so high as to cause decomposition of the p-bromophenol. It is ordinarily advantageous to avoid temperatures and pressures so high that the product obtained will predominate in polymerized isobutylene, the formation of which is enhanced by heat and pressure.

In general it has been found advantageous to employ ordinary concentrated sulfuric acid in amounts corresponding to from 3 to 5 per cent by weight of the p-halophenol. With this concentration the alkylation is sufficiently rapid, while with higher amounts of acid the tendency toward polymerization of the isobutylene is increased.

The reacting ingredients are contacted in the usual manner either continuously or in batch operation. If the operation is in batch, reaction is continued until no more isobutylene is absorbed; if continuous, the time of contact and temperature are controlled to permit complete alkylation without undesirable polymerization of the isobutylene. After completion of the reaction the products are usually washed with an aqueous solution of caustic soda or other equivalent alkali. The washing operation removes any remaining acidic agent and also removes all alkali-soluble material such as any unreacted p-halophenol, as well as alkylation products in which the alkylation has not proceeded to the point desired. The alkali washing is usually followed by water washing. The washed product may then be distilled under ordinary pressure or under vacuum and recrystallized in the usual manner to separate the by-products and obtain substantially pure 2,6-di-tertiary-butyl-4-halophenol.

The second step of the reaction involves the removal of halogen from the 2,6-di-tertiary-butyl-4-halophenol to give 2,6-di-tertiary-butylphenol. This reaction is preferably performed with potassium in the presence of anhydrous ammonia.

The procedure followed in preparing 2,6-di-tertiary-butylphenol can best be shown by the following example:

Example.—86.5 parts by weight of p-bromophenol and 4 parts of 96% sulfuric acid were introduced into a suitable reaction vessel. Isobutylene was then passed into the stirred mixture of acid and p-bromophenol at 65–70° C. until about 56 parts were absorbed. The reaction mixture was diluted with an equal volume of benzene and extracted twice with an equal volume of 20% sodium hydroxide solution to remove the catalyst and any unreacted p-bromophenol or 2-tertiary-butyl-4-bromophenol. The solution remaining after extraction was washed with water until neutral to litmus and the benzene removed under reduced pressure (10–20 mm.). The residue was distilled in vacuo and the fraction boiling at 104–107° C. at 1 mm. pressure was a white solid, 2,6-di-tertiary-butyl-4-bromophenol. The product, when recrystallized from 95% ethyl alcohol had a melting point of 83° C. The following analysis indicates the nature of the compound:

|  | Calculated | Found |
|---|---|---|
|  | Per cent | Per cent |
| Carbon content | 58.93 | 58.84 |
| Hydrogen content | 7.43 | 7.80 |
| Bromine content | 28.03 | 27.88 |

About 400 parts by weight of anhydrous ammonia was condensed on 10 parts of 2,6-di-tertiary-butyl-4-bromophenol in a liquid ammonia reaction vessel. Potassium was then introduced until the solution took on a permanent blue color. A small amount of ammonium chloride was added to destroy unreacted potassium and the ammonia was allowed to evaporate slowly. The residue was dissolved in a petroleum distillate (B. P. 60–70° C.), washed with water until neutral to litmus, and the petroleum distillate distilled off under reduced pressure (10–20 mm.). The product, 2,6-di-tertiary-butylphenol, when recrystallized from 95% ethyl alcohol, was a yellow solid having a melting point of 38–39° C.

The following analysis indicates the nature of the compound:

|  | Calculated | Found |
|---|---|---|
|  | Per cent | Per cent |
| Carbon content | 81.48 | 81.28 |
| Hydrogen content | 10.76 | 10.80 |

The compound prepared as indicated herein above, when added to a standard reference gasoline having an oxygen stability period of five hours, in an amount equal to 0.04 g. per 100 cc. of gasoline, increased the induction period to 15.75 hours, indicating an extremely satisfactory antioxidant effect, especially when viewed in the light of the economy and ease of preparation of the antioxidant and in view of the fact that this compound is insoluble in water and in dilute caustic alkali solution.

Thus we have described a new and useful compound 2,6-di-tertiary-butylphenol which has not previously been described and which is prepared by the process shown above. The compound is particularly useful as an antioxidant in hydrocarbon compounds such as gasoline and lubricating oil but it has other uses.

What we claim is:

1. The process of producing 2,6-di-tertiary-butylphenol which comprises alkylating a p-halophenol with isobutylene in the presence of an alkylation catalyst to 2,6 - di - tertiary - butyl-4-halophenol, and removing the halogen therefrom by reaction with an alkali metal in the presence of anhydrous ammonia to obtain said 2,6-di-tertiary-butylphenol.

2. The process of producing 2,6-di-tertiary-butylphenol which comprises alkylating p-bromophenol with isobutylene in the presence of from 3 to 5 per cent by weight of concentrated sulfuric acid based on the p-bromophenol to 2,6-di - tertiary - butyl-4-bromophenol, and removing the halogen therefrom by reaction with potassium in the presence of liquid ammonia to obtain said 2,6-di-tertiary-butylphenol.

GORDON H. STILLSON.
DAVID W. SAWYER.

REFERENCES CITED

The following references are of record in the file of this patent:

UNITED STATES PATENTS

| Number | Name | Date |
|---|---|---|
| 1,972,599 | Perkins | Sept. 4, 1934 |
| 2,010,595 | Klarmann | Aug. 6, 1935 |
| 2,248,830 | Stillson et al. | July 8, 1941 |
| 2,265,582 | Stevens | Dec. 9, 1941 |
| 2,275,175 | Cloud | Mar. 3, 1942 |
| 2,298,660 | Stevens et al. | Oct. 13, 1942 |

OTHER REFERENCES

Bartz: "Jour. Am. Chem. Soc.," 57, 371–6 (1935).

Pardee et al.: Ind. Eng. Chem., vol. 36, 595–603 (1944).

Auers et al.: Berichte, vol. 57, 1274–5 (1924).